(12) United States Patent
Hrastnik

(10) Patent No.: US 9,489,649 B2
(45) Date of Patent: Nov. 8, 2016

(54) MESSAGE PAYLOAD EDITOR

(75) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 337 days.

(21) Appl. No.: 13/526,006

(22) Filed: Jun. 18, 2012

(65) Prior Publication Data

US 2013/0339873 A1 Dec. 19, 2013

(51) Int. Cl.
G06F 3/00 (2006.01)
G06Q 10/06 (2012.01)
G06Q 10/10 (2012.01)
G06F 3/01 (2006.01)

(52) U.S. Cl.
CPC .......... *G06Q 10/0631* (2013.01); *G06Q 10/10* (2013.01)

(58) Field of Classification Search
CPC .. G06Q 10/107; G06Q 10/10; G06Q 10/109; G06Q 10/0631; H04L 12/581; G06F 3/0482
USPC ........................................................ 715/752
See application file for complete search history.

(56) References Cited

U.S. PATENT DOCUMENTS

| | | | |
|---|---|---|---|
| 2004/0169675 A1* | 9/2004 | Beck et al. ................... | 345/705 |
| 2004/0172592 A1* | 9/2004 | Collie ................. | G06F 17/2229 715/212 |
| 2006/0004746 A1* | 1/2006 | Angus ............... | G06F 17/30563 |
| 2006/0242649 A1* | 10/2006 | Gurevich ................ | G06F 9/541 719/315 |
| 2007/0079247 A1* | 4/2007 | Carignan et al. ............. | 715/745 |
| 2007/0220022 A1* | 9/2007 | Lankinen .......... | G06F 17/30569 |
| 2007/0239508 A1* | 10/2007 | Fazal ..................... | G06Q 10/10 705/7.36 |
| 2009/0171809 A1* | 7/2009 | Rothley ......................... | 705/27 |
| 2010/0161627 A1* | 6/2010 | Vossen .............. | G06F 17/30286 707/755 |
| 2011/0029983 A1* | 2/2011 | Lu ...................... | G06Q 10/0633 718/105 |

* cited by examiner

*Primary Examiner* — Nicholas Augustine
(74) *Attorney, Agent, or Firm* — Mintz Levin Cohn Ferris Glovsky and Popeo, P.C.

(57) ABSTRACT

Methods and apparatus, including computer program products, are provided for editing messages via a message-specific user interface. In some implementations, a method may be provided. The method may include receiving, at a user interface, data content of a message corresponding to a business object; presenting, at the user interface, the data content of the message corresponding to the business object, the user interface generated specifically for a type associated with the message; and initiating, at the user interface, at least one of a change and a save to the data content. Related systems, methods, and articles of manufacture are also disclosed.

17 Claims, 5 Drawing Sheets

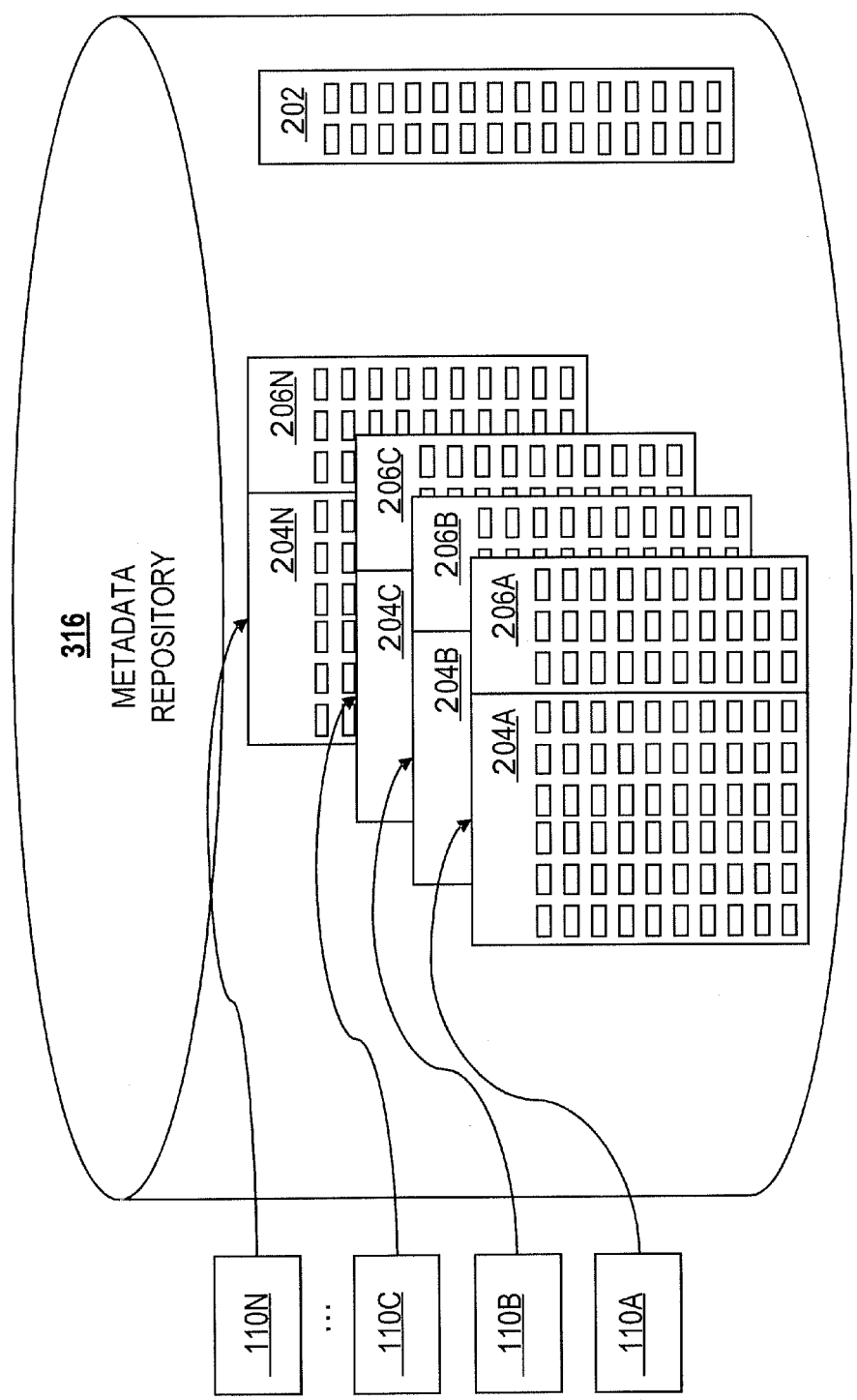

MESSAGE PAYLOAD EDITOR

FIELD

The present disclosure generally relates to data processing and, in particular, verification of message payloads.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture including on-premises components. As such, the organization can in some cases be more effectively served by an on-demand system or component, such as a software as a service (SaaS) arrangement in which the ERP system architecture is hosted on computing hardware such as servers and data repositories that are maintained remotely from the organization's location and accessed on-demand by authorized users at the organization via a thin client, such as for example a web browser, over a network.

SUMMARY

Methods and apparatus, including computer program products, are provided for editing messages via a message-specific user interface. In some implementations, a method may be provided. The method may include receiving, at a user interface, data content of a message corresponding to a business object; presenting, at the user interface, the data content of the message corresponding to the business object, the user interface generated specifically for a type associated with the message; and initiating, at the user interface, at least one of a change and a save to the data content.

In some implementations, the above-noted aspects may further include additional features described herein including one or more of the following. On or more messages may be monitored to detect the message corresponding to the user interface generated specifically for the type associated with the message. Detected messages may be forwarded to the user interface. The business object may represent at least content for a client user interface. Another user interface may present other data content of another message corresponding to another type of message associated with the business object. The presenting may further include presenting, at the user interface, metadata representative of the message, the metadata comprising navigation information, a text description of the message, and a conversion code. The user interface may be generated specifically for the type associated with the message. A plurality of user interface may be generated specifically each type of message in an enterprise resource planning system.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIG. 2 depicts a data repository implemented to include core software platform content, system content, and tenant content, in accordance with some exemplary implementations;

Figure 1:
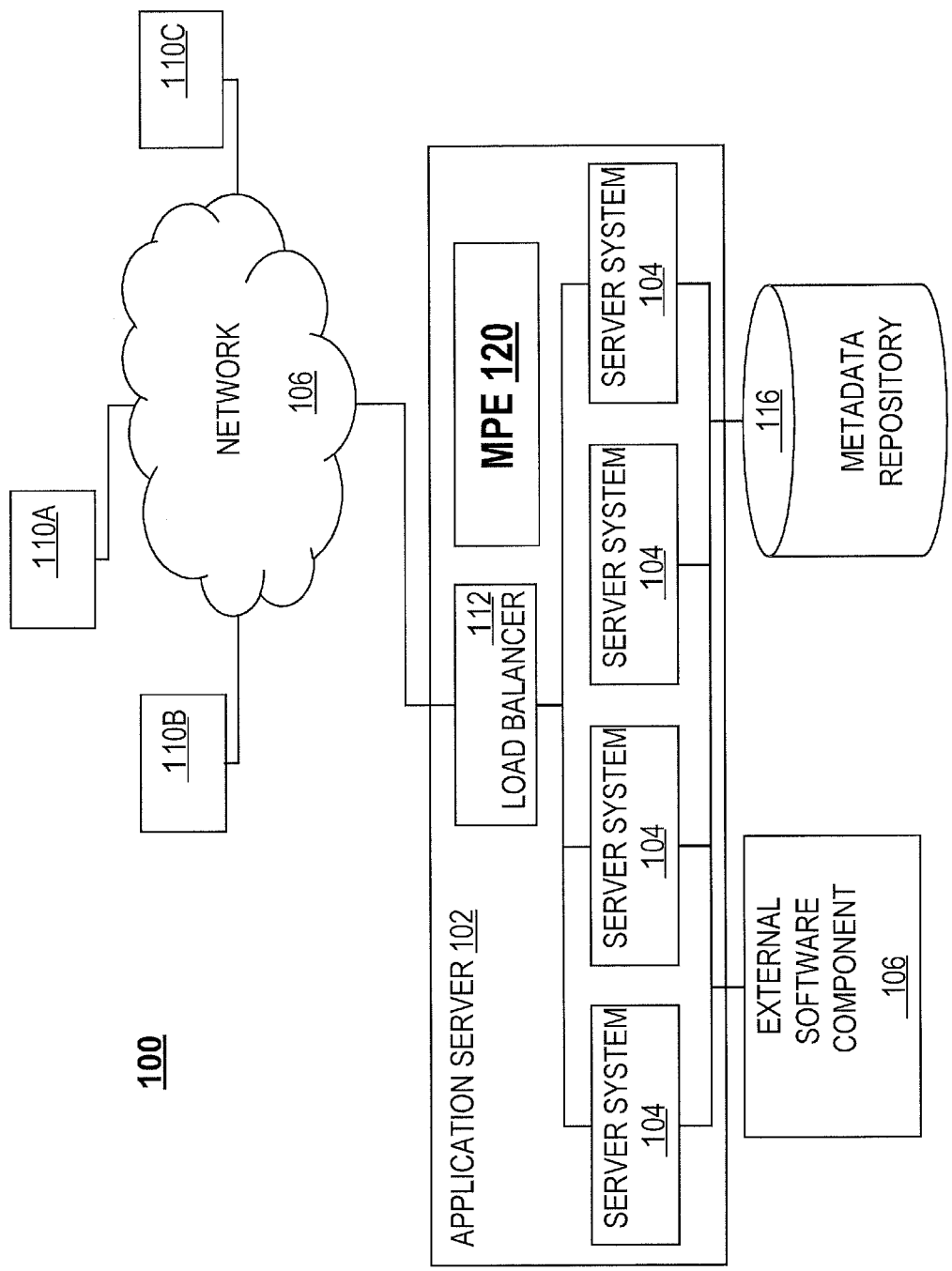
FIG. 1 depicts an example of a system 100 including a message payload editor 120, in accordance with some exemplary implementations.

Like labels are used to refer to same or similar items in the drawings.

DETAILED DESCRIPTION

In a service oriented architecture (SOA), such as for example a SaaS-based enterprise resource planning application, the basis of a user interface (UI) presented to a client, such as a thin client, can be a business object (BO). The BO for each UI can be defined based on a specific business use or a configuration of the organization/user to which the UI corresponds. In instances in which multiple organizations or discrete users (hereinafter referred to generally as "users") share core functionality of a service oriented architecture with the ability to customize user-specific functionality, particularly via a UI with one or more user-specific aspects or features, each customized feature, or aspects for each user, can require its own one or more business objects. Thus, several business objects can be needed to perform the tasks normally possible via a single UI.

Message based communications may be used to process the BOs and provide content for the UIs. However, there is a need to provide tools to support the analysis and editing/correction of these messages. For example, a message payload editor may be implemented to allow a user to readily determine whether a message format is correct, and, if not, allow correction. Specifically, the message payload editor may provide a UI for checking and correcting messages, and this UI may provide the checking and correcting in a business specific and/or application specific way. Moreover, the message payload editor may enable a non-technical, business user to understand issues with the sender of the message (e.g., in external communication scenarios). The message payload editor may also be configured to support applications in building business-user focused UIs, which are seamlessly integrated into existing application UIs and the business communication monitor (BCM). The message payload editor may enable business users to check content of exchanged messages in application specific business context sensitive UIs. The message payload editor may enable instance related authorization checks for accessing the message payload content. The message payload editor may also enable maintenance of message payload and control write authorizations.

Before providing additional description regarding the message payload editor disclosed herein the following provides an example of a framework in which the message payload editor may be implemented, although other frameworks may be used as well.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. For a system in which the application server 102 includes multiple server systems 104, the application server can include a load balancer 112 to distribute requests and actions from users at the one or more organizations 110A-110C to the one or more server systems 104. A user can access the delivery architecture across the network using a thin client, such as for example a web browser or the like, or other portal software running on a client machine. The application server 102 can access data and data objects stored in one or more data repositories 116. The application server 102 can also serve as a middleware component via which access is provided to one or more external software components 106 (e.g., public solutions) that can be provided by third party developers.

System 100 may also include a message payload editor 120 (labeled MPE) for viewing, editing, and/or correcting messages based on a UI specific to the message type, business object, or a combination of both.

A multi-tenant system such as that described herein can include one or more of support for multiple versions of the core software, backwards compatibility with older versions, stateless operation in which little, or no, user data or business data are retained at the thin client, and little, or no, need for tenant configuration on the central system. As noted above, in some implementations, support for multiple tenants can be provided using an application server 102 that includes multiple server systems 104 that handle processing loads distributed by a load balancer 112. Potential benefits from such an arrangement can, in some implementations, include, high and reliably continuous application server availability and minimization of unplanned downtime, phased updating of the multiple server systems 304 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

As in the example illustrated in FIG. 1, the metadata repository 116 can store a business object that represents a template definition of a standard business process. Each individual tenant 110A-110C can customize that standard template according to the individual business process features specific to business of the organization to which that tenant is assigned. Customizations can be stored as extensions in the metadata repository.

To provide for customization of the business process for each of multiple organizations supported by a single software delivery architecture 100, the data and data objects stored in the metadata repository 116 and/or other data repositories that are accessed by the application server 102 can include three types of content as shown in FIG. 2: core software platform content 202 (e.g., a standard definition of a business process), system content 204, and tenant content 206.

Core software platform content 202 may include content that represents core functionality and is not modifiable by a tenant.

System content 204 can in some examples be created by the runtime of the core software platform and can include core data objects that store concrete data associated with specific instances of a given business process and that are modifiable with data provided by each tenant. The data retained in these data objects are tenant-specific: for example, each tenant 110A-110N can store information about its own inventory, sales order, etc.

Tenant content 206A-206N may include data objects or extensions to other data objects that are customized for one specific tenant 110A-110N to reflect business processes and data (e.g., business objects) that are specific to that specific tenant and are accessible only to authorized users at the corresponding tenant. Such data objects can include a key field (for example "client" in the case of inventory tracking) as well as one or more of master data, business configuration information, transaction data, or the like. For example, tenant content 406 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like).

To provide a customized UI, the various elements of the UI, which can be tables, text, images, graphics, dynamic applets, or the like, may draw from or have a dependency on several underlying business objects drawn from multiple service providers. In the example of a multi-tenant software delivery architecture such as is depicted in FIG. 1 and FIG. 2 and described above, presentation of each of the business objects can include one or more of core software platform content 202, system content 204, and tenant content 206 drawn from the one or more repositories 116. In some implementations, a UI may access a single BO as an entry point for a model of the UI. A business object can be a data object that reflects aspects of a specific business configuration for users of a system. For a hierarchical UI model, which is typical, some, if not all, nodes of the BO or BOs, upon which a UI model relies, can be reachable via associations starting from a root node of a BO that is assigned to a root node of the UI model. An existing approach to this issue is the use of so-called controller objects (COs) or enhanced controller objects (ECOs) to aggregate multiple underlying BOs that are relied upon to produce a UI. A CO or an ECO, which is defined at design time, can define one BO with nodes and associations which are mapped from nodes and associations of several other data objects or BOs.

Figure 3A:
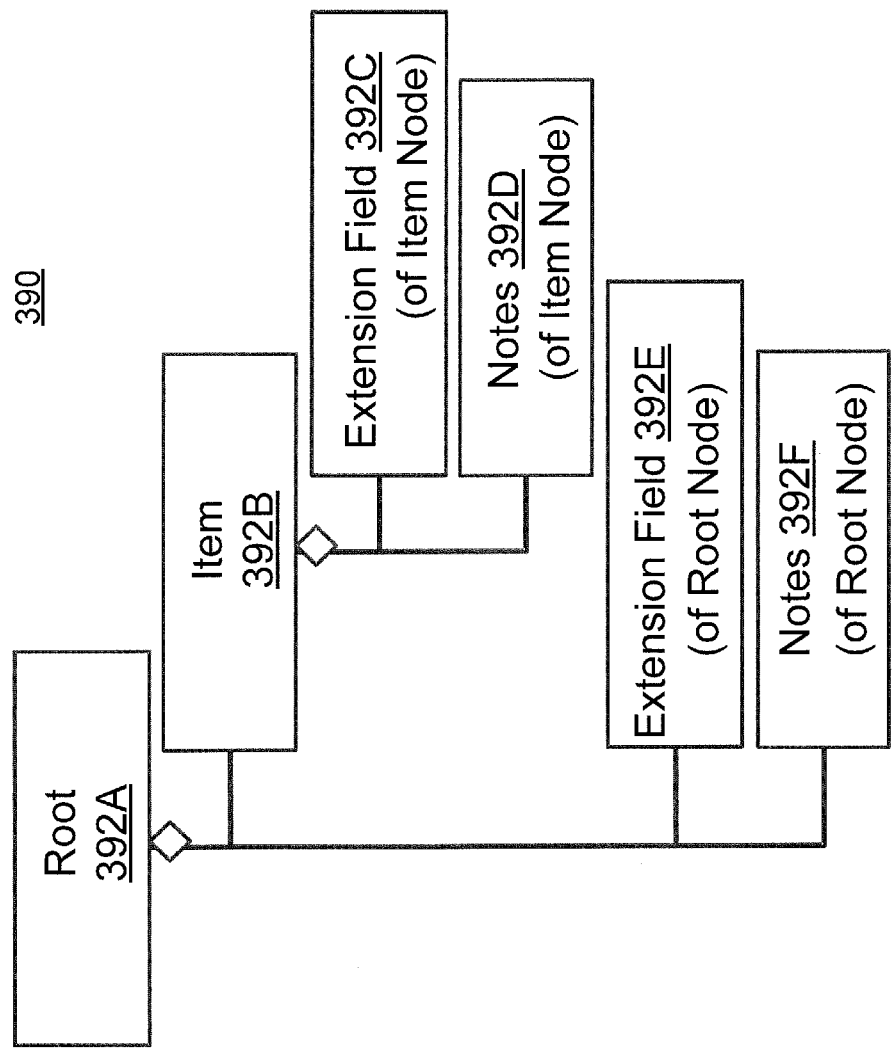
FIG. 3A depict an example of a business object, in accordance with some exemplary implementations.

FIG. 3A depicts an example of a business object 390 including a root node 392A, as noted above. The root node 392A is associated directly to an item node 392B, an extension field 392E, and notes 392F. The item node 392B is associated with extension field 392C and notes 392D.

Figure 3B:
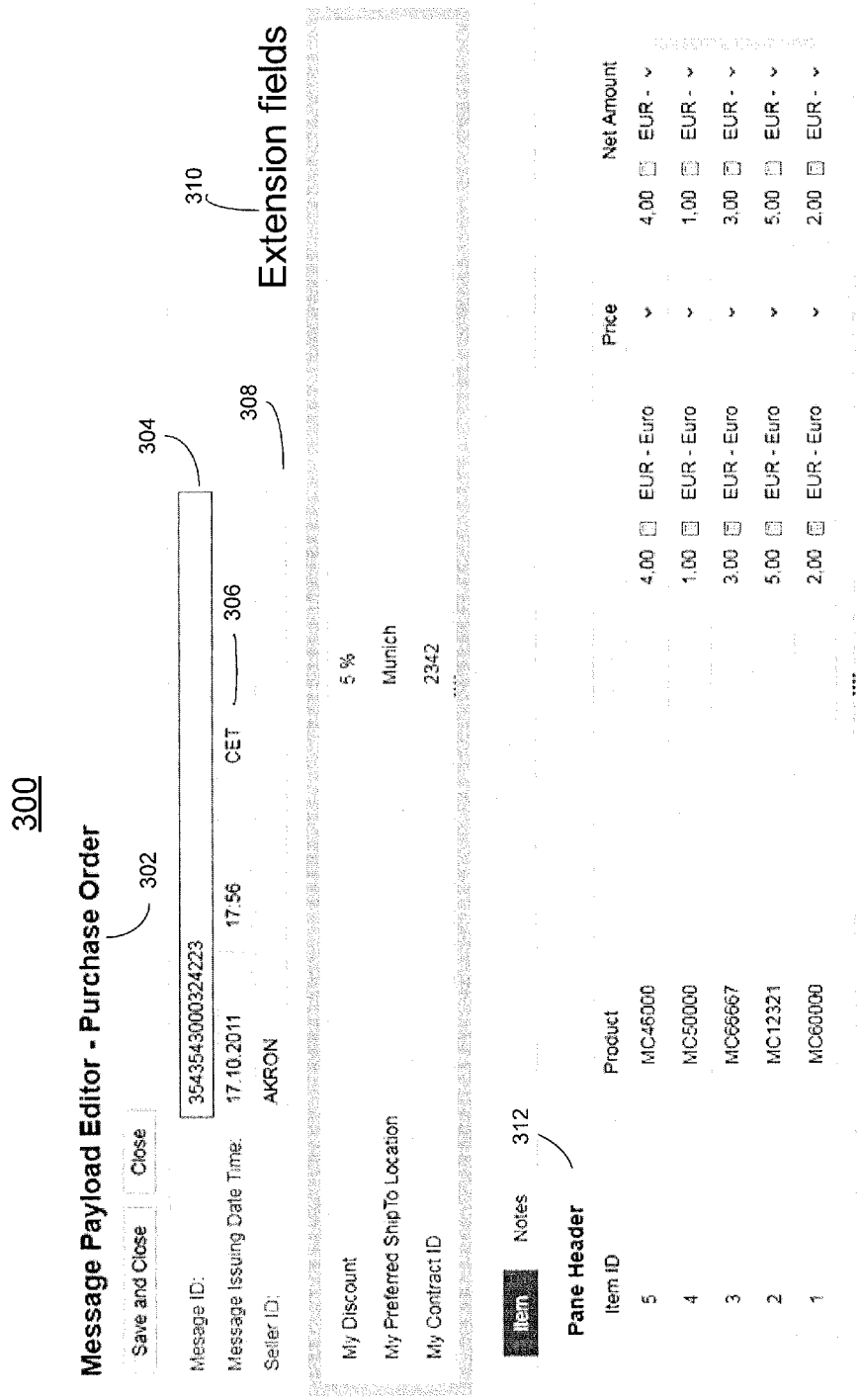
FIG. 3B depicts example user interface for message payload editing, in accordance with some exemplary implementations.

FIG. 3B depicts an example of a UI 300 generated by message payload editor 120. In some implementations, message payload editor 120 generates a UI for each type of message being tested/monitored at system 100. For example, each message generated in connection with an ERP system, including its BOs, UIs, and other components would include a certain UI generated and/or configured by message payload editor 120. When this is the case, UI 300 would correspond to a single message type.

UI 300 may be configured to display a message, to edit a message, and/or to check whether a message format is correct, and, if not, allow correction directly in the UI 300 itself. The UI 300 may handle content originating from a message, such as data coming from a data structure, such as a business object, and then presents the data in a suitable way for a user, such as a non-technical, business user. The UI 300 may not just be based on the actual message content but can provide additional information, such as descriptions for business object instances referenced in the message, conversions of code values to their textual descriptions, and the like) and provide additional functionality, such as navigation information to master data UIs. The message may contain references to master data records. For example, a sales order may refer to several materials by their IDs. In order to support evaluation of the complete master data records, these IDs may be rendered as links or buttons in the UI. Once selected/clicked, the standard UI (e.g., factsheet or object Instance Floor plan) for the material may be opened to show the relevant information. Generally, this is based on so-called object based navigation. The source UI provides the information about the material record by its material ID and triggers an event for starting the target UI.

The UI 300 may, as noted, be generated based on a corresponding enhanced controller objects (ECOs). The message payload editor 120 may be configured to implement the ECO by providing a common super class to handle generic contracts of the enterprise service infrastructure, to provide access to message content, and/or to provide access to utility functions, such as the de-serialization of message content.

The message payload editor 120 may be integrated with a business communication monitor (BCM) in system 100, which monitors message traffic within system 100. The using application can determine which message types (based on the service interface operation code) the business communication monitor shall monitor in concert with the message payload editor 120. This information may be provided via an input of the business communiction monitor and evaluated when the message payload editor 120 is executed/launched. For these monitored messages, the message payload editor 120 may provide a target side dispatching UI 300, which allows applications to redirect the navigation to their own UI for editing message payload.

In some implementations, message payload editor 120 enables a view of UI 300 to assess message content. The message payload editor 120 may also support applications in building business user focused UIs seamlessly integrated into existing application UIs as there is little, or no, need for defining and implementing receiving error tolerant BOs, which wrap the message content. In some implementations, the message payload editor 120 may reduce, or eliminate, the need for replication of data of existing message persistency and reduce, or eliminate, redundancy for complex technical and business relatated check logic.

The framework disclosed herein provides a core functionality. However, there are some application exits provided by the framework, which applications can use to flexibly adopt the generic framework functionality according to their needs. For instance, to define instance restrictions or enrich the message data with additional business related information.

Figure 4:
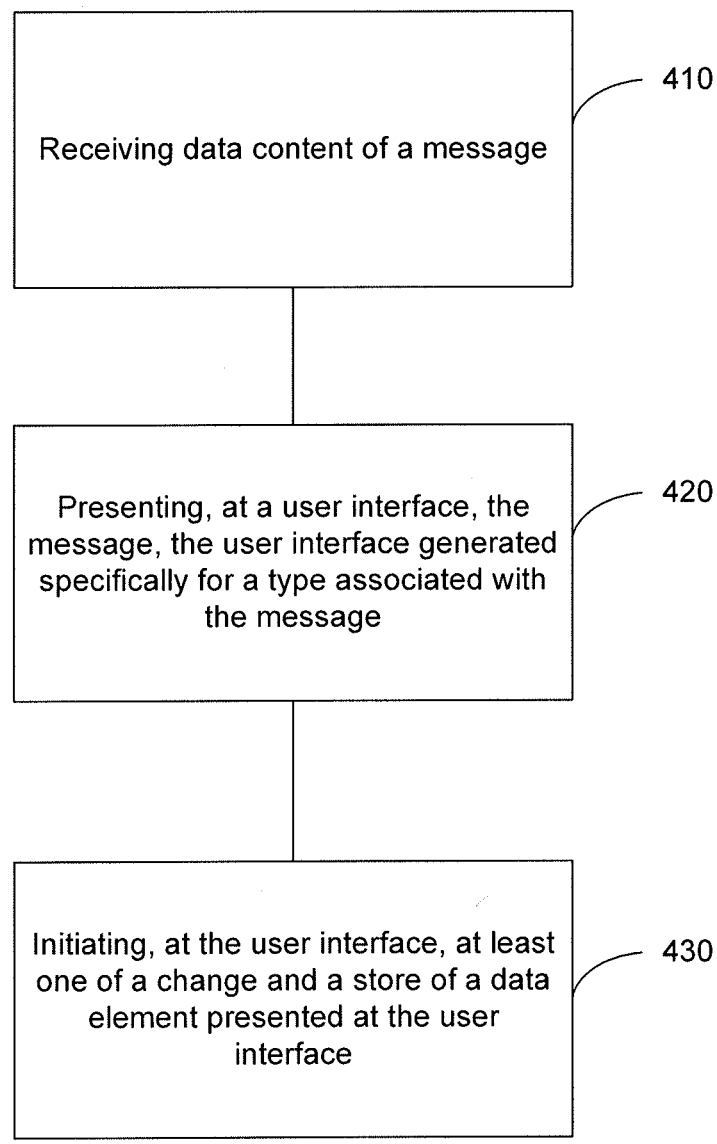
FIG. 4 depicts an example of a process for message payload editing, in accordance with some exemplary implementations.

FIG. 4 depicts an example process 400 for the message payload editor, in accordance with some exemplary implementations.

At 410, a user interface may receive data content of a message. For example, message payload editor 120 may generate a user interface, such as UI 300, and then receive a message (or its data content) from a business communications monitor. The received message (or its content) is then provided to UI 300 for presentation. The message may be associated with a business object of system 100, and the message may include data content of a BO stored in metadata repository 116, as noted above. Moreover, the data content may correspond to tenant content, although the content may correspond to other types of data as well.

At 420, the user interface message may be presented at a UI. For example, the message (or its content) sent by the message payload editor 120 may be received at the UI 300 and presented. Moreover, the UI presenting the message (or its content) may be generated specifically for the type of message being handled. For example, system 100 may have different message types associated with different types of messages. In this example, each message type would have a different type of UI. Moreover, help information to assist in understanding the message and its data content. Typically, messages exchanged between systems may be optimized for throughput and automated processing. This results in the message content being hard to map for end-user comprehension and/or use. As an example, a code may be passed with the value "2" and would need to be mapped to its external description "Released" to allow a business user to understand the code. Similarly, an identifier "P12312" may be enriched with the description of the object "Engine V6-2.5 Diesel" (that may not part of the message) in order to increase readability. The user interfaces disclosed herein may allow viewing of these messages with the additional description to allow an end-user to view and comprehend the message. Furthermore, the message structure may be considered a hierarchical tree structure, which may need to be restructured/flattened via the disclosed user interfaces to allow end users to obtain relevant information on a glance (e.g. by showing all items in a single table irrespectively of their parents).

At 430, the viewed message (or its content) may be changed via the user interface and then stored if the changes are to be saved to a repository, such as metadata repository 116. For example, data content 308 may be corrected at UI 300 to "Dayton," and then submitted for saving by selecting "Save and Close."

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to perform operations comprising:
   receiving, at a message payload editor, data content of a message corresponding to a business object, the data content organized into a hierarchical structure, and the data content including one or more code values;
   generating, through the message payload editor, a user interface based at least in part upon a message type for the message;
   restructuring, through the message payload editor, the hierarchical structure of the data content into a single level;
   converting, through the message payload editor, the one or more code values into one or more corresponding text descriptions;
   sending, through the message payload editor and for presenting, through the user interface, the restructured data content, the one or more corresponding text descriptions, a description of an instance of the business object, and metadata representative of the message, the restructured data content presented in a single table irrespective of a number of levels in the hierarchical structure, the metadata comprising navigation information and a text description of the message;
   receiving a user-initiated request to change the data content; and
   initiating, at the message payload editor and in response to the user-initiated request, at least one of a change and a save to the message.

2. The non-transitory computer-readable medium of claim 1 further comprising:
   monitoring one or more messages to detect the message corresponding to the business object.

3. The non-transitory computer-readable medium of claim 2 further comprising:
   forwarding, to the user interface, the detected message.

4. The non-transitory computer-readable medium of claim 1, wherein the business object represents at least content for a client user interface.

5. The non-transitory computer-readable medium of claim 1 further comprising:
   providing, to enable presenting at another user interface, other data content of another message corresponding to another type of message associated with the business object.

6. The non-transitory computer-readable medium of claim 1 further comprising:
   generating the user interface specifically for the type associated with the message.

7. The non-transitory computer-readable medium of claim 1 further comprising:
   generating a plurality of user interface specific to each type of message in an enterprise resource planning system.

8. A system comprising:
   at least one processor; and
   at least one memory including code which when executed by the at least one processor provides operations comprising:
   receiving, at a message payload editor, data content of a message corresponding to a business object, the data content organized into a hierarchical structure, and the data content including one or more code values;

generating, through the message payload editor, a user interface based at least in part upon a message type for the message;

restructuring, through the message payload editor, the hierarchical structure of the data content into a single level;

converting, through the message payload editor, the one or more code values into one or more corresponding text descriptions;

sending, through the message payload editor and for presenting through the user interface, the restructured data content, the one or more corresponding text descriptions, a description of an instance of the business object, and metadata representative of the message, the restructured data content presented in a single table irrespective of a number of levels in the hierarchical structure, the metadata comprising navigation information and a text description of the message;

receiving a user-initiated request to change the data content; and initiating, at the message payload editor and in response to the user-initiated request, at least one of a change and a save to the message.

9. The system of claim 8 further comprising:
monitoring one or more messages to detect the message corresponding to the business object.

10. The system of claim 9 further comprising:
forwarding, to the user interface, the detected message.

11. The system of claim 8, wherein the business object represents at least content for a client user interface.

12. The system of claim 8 further comprising:
providing, to enable presenting at another user interface, other data content of another message corresponding to another type of message associated with the business object.

13. The system of claim 8 further comprising:
generating the user interface specifically for the type associated with the message.

14. The system of claim 8 further comprising:
generating a plurality of user interface specific to each type of message in an enterprise resource planning system.

15. A method comprising:
receiving, at a message payload editor, data content of a message corresponding to a business object, the data content organized into a hierarchical structure, and the data content including one or more code values;

generating, through the message payload editor, a user interface based at least in part upon a message type for the message;

restructuring, through the message payload editor, the hierarchical structure of the data content into a single level;

converting, through the message payload editor, the one or more code values into one or more corresponding text descriptions;

sending, through the message payload editor and for presenting through the user interface, the restructured data content, the one or more corresponding text descriptions, a description of an instance of the business object, and metadata representative of the message, the restructured data content presented in a single table irrespective of a number of levels in the hierarchical structure, the metadata comprising navigation information and a text description of the message;

receiving a user-initiated request to change the data content; and initiating, at the message payload editor and in response to the user-initiated request, at least one of a change and a save to the message, wherein the receiving, the generating, the restructuring, the converting, the sending, and the initiating are performed by at least one processor.

16. The method of claim 15 further comprising:
monitoring, via the at least one processor, one or more messages to detect the message corresponding to the business object.

17. The non-transitory computer-readable medium of claim 1, wherein the navigation information includes at least one link and/or button to a master data record.

* * * * *